(12) United States Patent
Bruton, III et al.

(10) Patent No.: US 7,702,785 B2
(45) Date of Patent: Apr. 20, 2010

(54) METHODS, SYSTEMS AND COMPUTER PROGRAM PRODUCTS FOR SELECTIVELY ALLOWING USERS OF A MULTI-USER SYSTEM ACCESS TO NETWORK RESOURCES

(75) Inventors: David Aro Bruton, III, Raleigh, NC (US); Linwood H. Overby, Jr., Raleigh, NC (US); Adolfo Francisco Rodriguez, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 3341 days.

(21) Appl. No.: 09/773,811

(22) Filed: Jan. 31, 2001

(65) Prior Publication Data

US 2002/0103903 A1 Aug. 1, 2002

(51) Int. Cl.
*G06F 15/173* (2006.01)
(52) U.S. Cl. ............... 709/225; 709/203; 709/223; 709/249; 709/250
(58) Field of Classification Search ........... 709/223, 709/225, 203, 249, 250
See application file for complete search history.

(56) References Cited

U.S. PATENT DOCUMENTS

| | | | | |
|---|---|---|---|---|
| 5,191,611 A | * | 3/1993 | Lang | 705/53 |
| 5,548,649 A | * | 8/1996 | Jacobson | 713/153 |
| 5,991,519 A | * | 11/1999 | Benhammou et al. | 726/3 |
| 6,321,334 B1 | * | 11/2001 | Jerger et al. | 726/1 |
| 6,366,912 B1 | * | 4/2002 | Wallent et al. | 707/9 |
| 6,473,800 B1 | * | 10/2002 | Jerger et al. | 709/226 |
| 6,611,916 B1 | * | 8/2003 | Cacace-Bailey et al. | 726/6 |
| 2001/0052073 A1 | * | 12/2001 | Kern et al. | 713/161 |
| 2002/0099944 A1 | * | 7/2002 | Bowlin | 713/185 |
| 2002/0149467 A1 | * | 10/2002 | Calvesio et al. | 340/5.52 |
| 2003/0041267 A1 | * | 2/2003 | Fee et al. | 713/201 |

OTHER PUBLICATIONS

Smith, Richard E., "Internet Cryptography," 1997, pp. 183-187.

* cited by examiner

*Primary Examiner*—Kenny S Lin
*Assistant Examiner*—Lan-Dai T Truong (57) ABSTRACT

Methods, systems and computer program products are provided for selectively allowing a user of a multi-user system access to a plurality of resources in a network. Pursuant to these methods, systems and computer program products, a request, originated by a user of the multi-user system, may be received to transmit a message over the network to one of the plurality of resources in the network. A security zone associated with this resource may then be identified. Pursuant to the operations of the present invention, if it is determined that the user is authorized access to the identified security zone, the message may be forwarded over the network to the resource.

24 Claims, 6 Drawing Sheets

| Resource/Group | Security Zone |
|---|---|
| 01011*** | B |
| 0101101* | A |
| 0011**** | C |
| 01100011 | D |
| 01100010 | D |
| 1011**** | B |
| 110001** | A |
| 110***** | C |

Figure 4

| Security Zones | User |
|---|---|
| A | User 1, User 3, User 4 |
| B | User 1, User 4 |
| C | User 2, User 5, User 6 |
| D | User 2, User 3, User 5 |

METHODS, SYSTEMS AND COMPUTER PROGRAM PRODUCTS FOR SELECTIVELY ALLOWING USERS OF A MULTI-USER SYSTEM ACCESS TO NETWORK RESOURCES

FIELD OF THE INVENTION

The present invention relates to multi-user computer systems and, more particularly, to operations for controlling access by users of a multi-user system to resources within a network.

BACKGROUND OF THE INVENTION

Networks in which a plurality of computers and other electronic devices are inter-connected by wired or wireless communications links to facilitate communications between users and/or the sharing of resources, (e.g., hardware, software, data sets, etc.) are known in the art. One well known type of network is an internet protocol or "IP" network which operates under the IP protocol that has been developed to control communications sent over the Internet. Networks operating under the IP protocol typically include large numbers of geographically dispersed devices that are interconnected by a plurality of communications links and network routing and control resources. A wide variety of different devices may be included in the network, including, for example, mainframe computers, file servers, personal computers, printers, work stations, scanners, personal data assistants, cellular telephones, etc. Data processing devices such as, for example, mainframe computers that are part of the network may often be accessed by a plurality of users in the network.

Each device in the IP network is typically assigned an IP address. Communications packets sent over the IP network typically include headers that provide various information regarding the source and intended destination of the packet. This information may include, for example, the IP addresses of the source and/or destination devices, protocol and port information, and various other information which is well known to those of skill in the art.

In many instances, access to certain devices (e.g., computers, routers, printers, etc.) in an IP network may be restricted such that certain users are not permitted to access these resources. To provide such controlled access, an IP network may include "firewalls" which use packet level filtering to control access to devices in the IP network. Firewalls may be implemented at host devices and examine the IP source address, protocol, port and/or other information included in each received packet to determine if the packet will be processed by the host device. Firewalls may also be implemented at points of entry to specific sub-networks that have different security requirements than the IP network as a whole. Thus, for example, a firewall may be placed at a local area network server to restrict the access of those outside the local area network to devices within the local area network.

Firewalls, however, may not provide an effective method of controlling access to network devices in all situations. Accordingly, there is a need for improved methods and systems of controlling user access to devices in an IP network.

SUMMARY OF THE INVENTION

Embodiments of the present invention include methods, systems and computer program products for selectively allowing a user of a multi-user system access to a plurality of resources in a network. Pursuant to these methods, systems and computer program products, a request, originated by a user of the multi-user system, may be received to transmit a message over the network to one of the plurality of resources in the network. A security zone associated with this resource may then be identified. Pursuant to the operations of the present invention, if it is determined that the user is authorized access to the identified security zone, the message may be forwarded over the network to the resource.

In embodiments of the present invention, a security zone may be associated with each of the plurality of resources in the network. Operations may also be provided for specifying the security zones to which particular users of the multi-user system are authorized access. The operations for identifying the security zone associated with the resource may comprise accessing a data structure that specifies the security zone associated with each resource in the plurality of resources.

In further embodiments of the present invention, at least one entry in the data structure may specify the security zone associated with a group of the resources in the plurality of resources. In these embodiments, the step of identifying the security zone associated with the one of the plurality of resources may comprise identifying the security zone associated with the most specific entry in the data structure that includes the resource. The multi-user system may perform the operations for identifying the security zone associated with a resource in the network and determining whether a particular user is authorized access to the identified security zone.

Methods, systems and computer program products are also provided for determining whether to allow an operation associated with a user identification corresponding to a user of a multi-user system that involves access to a resource in a network. Pursuant to these methods, systems and computer program products (i) the resources in the network may each be classified as being associated with a particular security zone, and (ii) the security zones to which each user identification may have access may be specified. An operation may then only be allowed if the user identification is specified as having access to the security zone associated with the network resource which is to be accessed in the operation.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in conventional procedural programming languages, such as, for example, the "C" programming language or PL/X. However, the computer program code for carrying out operations of the present invention may also be written in an object oriented programming language such as Java®, Smalltalk or C++. The program code may execute entirely on a single computer, or be distributed so as to execute on a plurality of computers and/or other data processing devices.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

The present invention relates to methods, systems and computer program products for controlling user access to "resources" in a computer network such as an internet protocol ("IP") network. In particular, the present invention provides mechanisms for limiting the access of "users" of a "multi-user system" to resources in the network in situations where some, but not others, of the users of the multi-user system should be allowed access to the network resources that are to be protected.

As will be appreciated by those of skill in the art, typically a number of different persons and/or devices access and use the mainframe computer or other data processing device associated with a multi-user system. Each such person or device will normally have its own (or a shared) "user identification." The persons/devices accessing the data processing device may be resident at the data processing device, connected by a hard-wired connection, connected via a network connection, or connected via a variety of other connections.

Typically, a user identification is associated with each application being executed at any given time on the data processing device. As noted above, such a user identification could be associated with a person resident at the data processing device or, alternatively, with a person accessing the data processing device from thousands of miles away over a network connection. Likewise, the user identification may be associated with a person or group of persons or, alternatively, may be associated with a device or group of devices. As used herein, the term "user" refers to the person(s) and/or device(s) associated with a particular user identification, and the term "multi-user system" refers to a computer or other data processing device which more than one user may use to execute applications. However, since each application executing on a multi-user system is generally associated with some user identification, the term "user" may likewise be viewed as referring to a piece of work executing on the multi-user system (since it is understood that there is a user identification that is associated with that piece of work).

As will be appreciated by those of skill in the art, a wide variety of different computers, printers, file servers, web servers, data processing devices, etc. can be interconnected in a network, and that these devices may further include, or be connected to, additional devices such as disk drives, modems, printers, etc. It will be understood that as used herein, the term "resource" refers to any separately addressable entity in the network. Thus, for example, in an IP network, a resource refers to any device in the network having its own IP address.

Embodiments of the present invention will now be described with reference to an IP network. However, it will be appreciated that the methods, systems and computer program products of the present invention are equally applicable to other types of networks, such as, for example, local area networks or networks operating under the Systems Network Architecture ("SNA") protocol.

As noted above, in conventional IP networks, firewalls that implement host-based packet filtering are typically provided to control access to resources within the IP network. These firewalls examine parameters such as the source IP address, port number, protocol, etc. specified in individual data packets to evaluate whether or not the packet should be forwarded beyond the firewall. However, when a data packet is originated and transmitted over the network by a multi-user system, the source IP address, port number, protocol and other potential identification parameters may be the same for all packets sent by the multi-user system, regardless of which particular user of the multi-user system originated the packet. Consequently, traditional firewalls may not be an effective mechanism for selectively allowing the users of such multi-user systems access to resources in the IP network.

An example of a multi-user system is an IBM S/390 mainframe computer that serves as a portal to an IP network for a plurality of user workstations and applications. Each workstation may be accessed by one or more different users, and additional users in the network may access and execute software applications on the S/390 mainframe computer via a network, Telnet or other connection. It will be understood that numerous other multi-user systems are commonly connected to IP networks, such as various server platforms manufactured by Hewlett Packard and Sun, local area networks operating under Windows NT, etc. When such multi-user systems are included in, or have access to, the IP network, conventional host-based firewalls may not provide a mechanism for selectively allowing and restricting access by users of the multi-user system to resources in the IP network.

Pursuant to the teachings of the present invention, methods, systems and computer program products for controlling user access to the IP network at the multi-user system are provided. The approach of the present invention for controlling user access to IP network resources may be combined with conventional IP network security mechanisms, such as packet filtering firewalls, to provide a fully secure networking environment. Thus, the methods, systems and computer program products of the present invention may be used locally, at the multi-user system, to restrict user access to resources in the IP network, while the firewalls can be used within the IP network to globally restrict access to network resources based on criteria such as source IP address.

Figure 1:
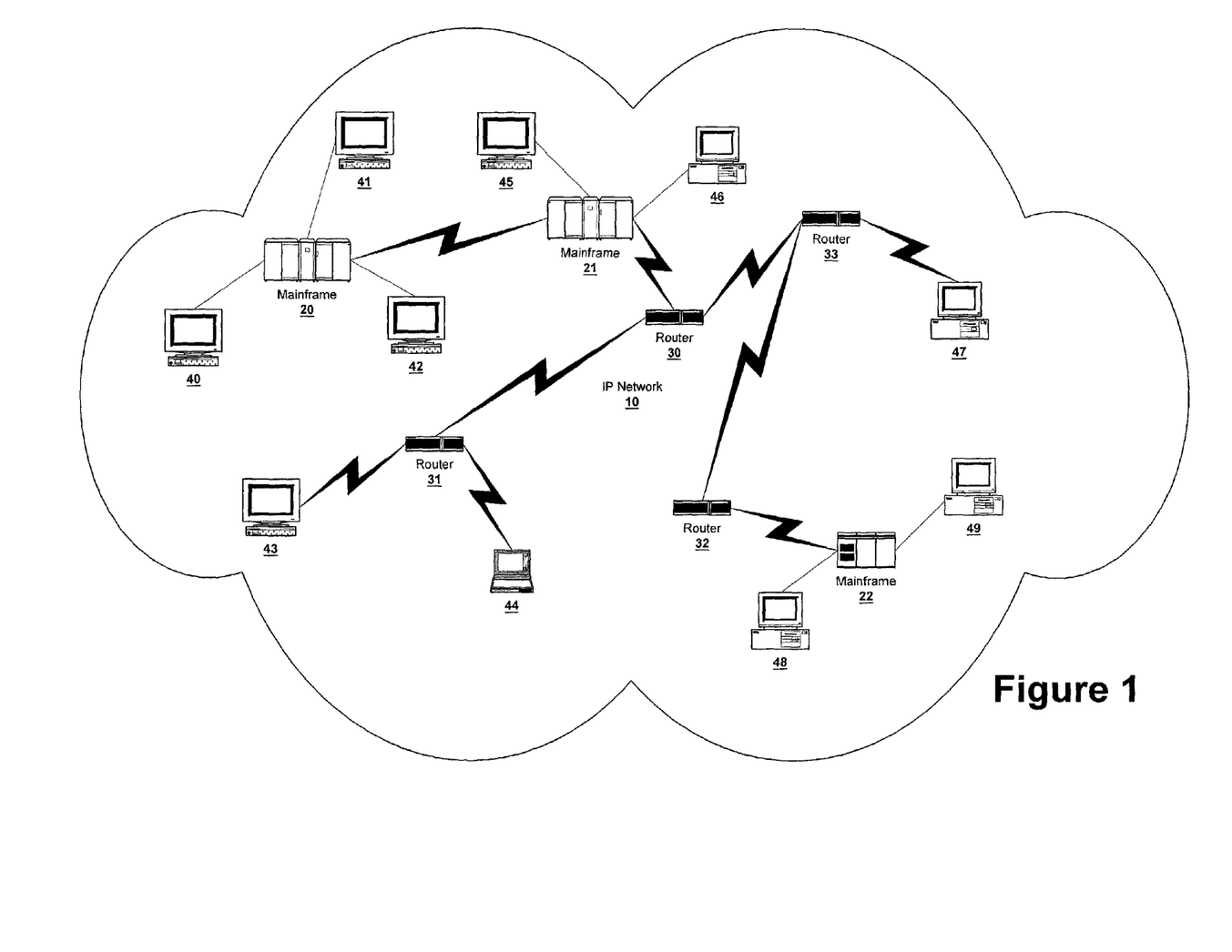
FIG. 1 is a block diagram of a network environment in which the present invention may be implemented.

Referring first to FIG. 1, an IP network environment in which embodiments of the present invention may be implemented will be generally described. The IP network 10 of FIG. 1 is provided for illustrative purposes only, and those of skill in the art will appreciate that a typical IP network may include thousands of users, and include a wide variety of network resources and devices. As illustrated in FIG. 1, the IP network 10 includes a plurality of mainframe computers 20, 21, 22, routers 30, 31, 32, 33 and workstations 40, 41, 42, 43, 44, 45, 46, 47, 48, 49 interconnected by network communications links. As shown in FIG. 1, the workstations 40-49 may either have direct access to the IP network 10, or may access other resources in the IP network 10 via one or more of the mainframe computers 20-22.

As noted above, a "multi-user system" refers to a computer or other data processing device which may execute applications associated with more than one user. In FIG. 1, each of the mainframe computers 20-22 comprise such a multi-user system, as might additional of the workstations 40-49 depicted in FIG. 1 to the extent they likewise execute applications associated with more than one user. Thus, it will be appreciated that virtually any device may act as a "multi-user system" and that the present invention is applicable to all types of multi-user systems, and not just systems with mainframe computers. To simplify the following discussion, mainframe computers 20-22 will be treated as the only multi-user systems in FIG. 1.

In the IP network 10 of FIG. 1, a software application or other piece of work executing on one of the mainframe computers 20 may generate a request to access another resource (e.g., mainframe computer 22) in the IP network. While the software application running on the mainframe computer 20 will be associated with a particular user in the network (who might be resident at mainframe computer 20, one of the attached workstations 40-42, or at some other device in the network), typically, the connect call originated by the mainframe computer 20 to establish the connection with mainframe computer 22 will not specify the user identification associated with the application that caused the connect call to be originated. As a result, mainframe computer 22 (and other devices in network 10) generally will not have knowledge as to which user caused the connect call to be generated, but instead will just know that the connect call was transmitted by mainframe computer 20. In this situation, conventional firewalls may not be capable of allowing some of the users of mainframe computer 20 access to a resource in the network having heightened security requirements (i.e., a resource which not every user or potential user of IP network 10 may access) while preventing other users of mainframe computer 20 access to such a restricted access resources.

Pursuant to the teachings of the present invention, the IP network 10 may be classified into "security zones" to facilitate allowing only selected users of a multi-user system such as mainframe computer 20 access to the restricted access network resources. A different security zone may be defined for each distinct level of security sensitivity required by the resources in IP network 10. While a particular resource may be classified as belonging to multiple security zones, in embodiments of the present invention each network resource is classified as belonging to a single security zone. Network resources which are not classified as belonging to a security zone may be assigned to a default security zone.

Figure 2:
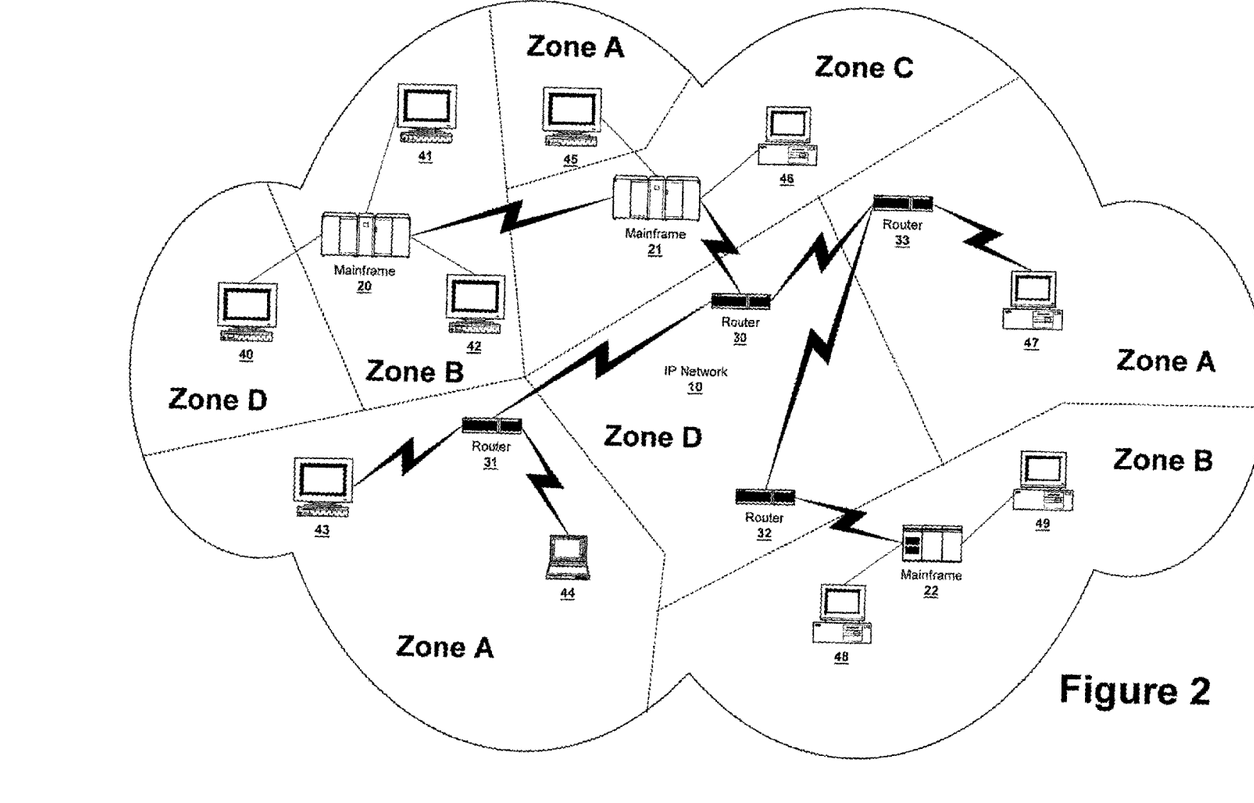
FIG. 2 illustrates the network environment of FIG. 1 wherein the network has been divided into a plurality of security zones.

FIG. 2 illustrates one possible classification of security zones for the IP network 10 of FIG. 1. In the example of FIG. 2, each resource in the IP network 10 belongs to one of four different security zones, which are labeled as Zones A-D in FIG. 2. As indicated in FIG. 2, a particular security zone need not be contiguous, as typically network resources are assigned to security zones based on their security sensitivity and/or based on which users are allowed access to the resource.

In embodiments of the present invention, the classification of the IP network 10 into security zones may be performed by the security administrator for the IP network 10. However, this function could also be carried out by other individuals and/or resources in the network, including the system administrator for one of the multi-user systems, such as the system administrator for one of the mainframe computers 20-22. Moreover, in embodiments of the present invention, the multi-user system may perform the security zone classification of network resources for the purpose of limiting certain users of that particular multi-user system access to resources in the IP network 10. In such embodiments, no one outside the multi-user system may even be aware of the security zone classification.

The security zone classification may be used to determine which users of one or more of the multi-user systems may access which resources in the IP network 10. This determination may be made, for example, by the security system, if provided, of a multi-user system such as mainframe computer 20. By way of example, one known multi-user system is the S/390 mainframe computer manufactured by International Business Machines, Inc. of Armonk, N.Y. The operating system software, namely the OS/390, that is part of the S/390 system includes a security manager that has a Resource Access Control Facility or "RACF." The RACF is designed to control access of users of the S/390 system to hardware and software within the S/390 system, and occasionally may also be used to control user access to external devices such as a printer. The RACF includes a database 132 that specifies the hardware and software each user of the S/390 may access. This database is typically generated at installation, and updated as necessary thereafter. As described below, the RACF may be used according to embodiments of the present invention to control the access that users of S/390 system are provided to resources external to the S/390 in the IP network 10.

Figure 3:
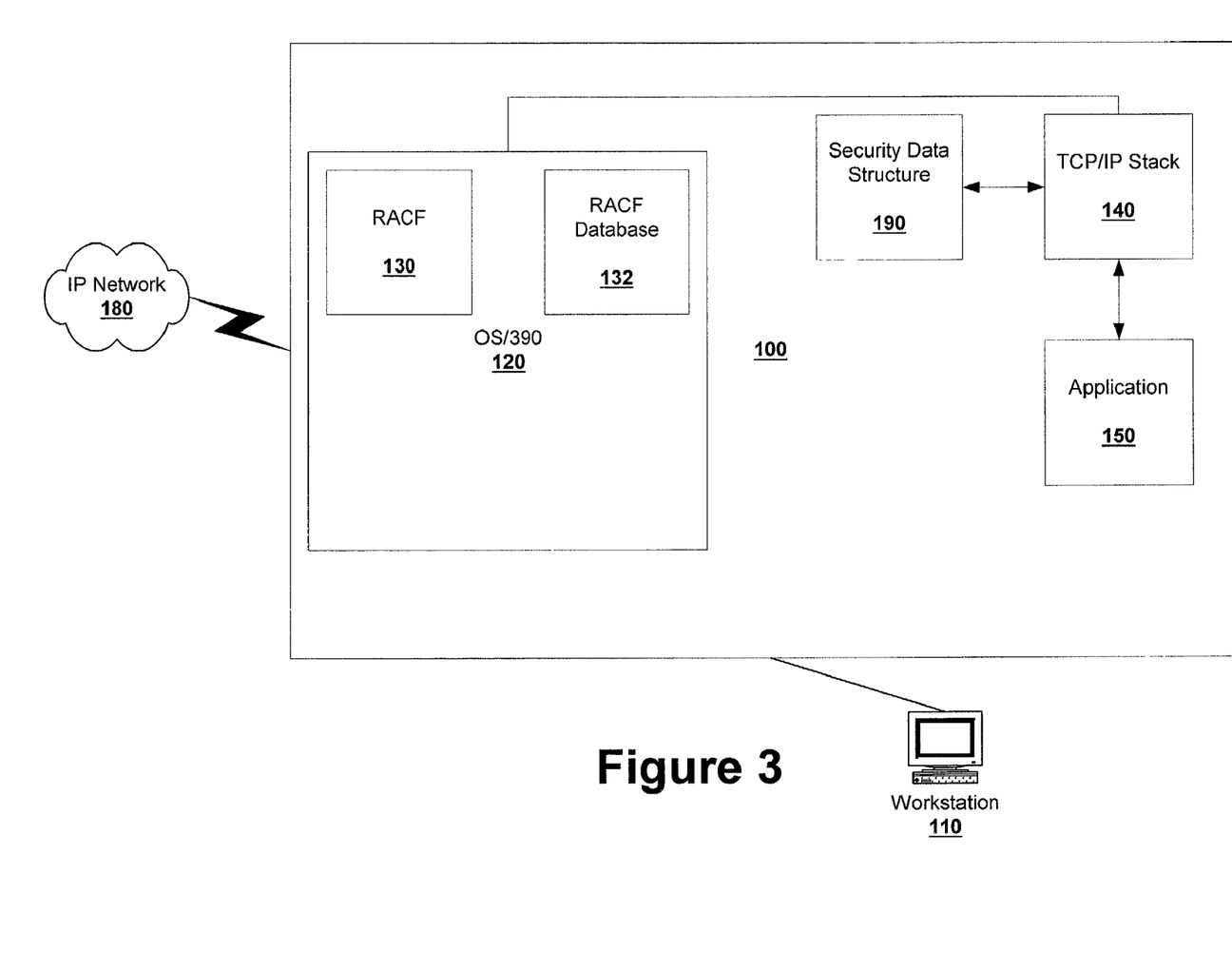
FIG. 3 is a block diagram of aspects of an S/390 computer system which may be used to implement the operations of embodiments of the present invention.

FIG. 3 is a block diagram of portions of an S/390 system 100 in which an application 150 is being run. In the example of FIG. 3, the application 150 is being run at the request of a user that is accessing the S/390 system 100 via the workstation 110. The application 150 is generating communications that are to be transmitted over an IP network 180. As shown in FIG. 3, the S/390 system includes an OS/390 operating system 120, which includes a RACF 130. In the example of FIG. 3, the application 150 is communicating over the IP network 180 using a TCP/IP protocol. Thus, a communications process such as the TCP/IP kernel 140 is shown as being included in the operating system kernel of the S/390 system 100. It will be understood that other kernel elements are typically also found on the S/390 system 100, which other kernel elements may further support communications with applications over the IP network 180 using other layered protocols. Similarly, the communications process may be a communications protocol stack, such as a TCP/IP communications protocol stack, or such other process which may be provided separate from the operating system kernel but which may also provide for controlling data transmission transaction requests received from the application 150.

During initialization of the TCP/IP kernel 140, a data structure 190 may be accessed that contains information regarding the security zone to which each resource in the TCP/IP network 180 belongs. By way of example, this data structure 190 might contain the IP address of each resource and/or group of resources in the TCP/IP network 180, along with the name (herein "zonename") of the security zone to which the resource or group of resources belongs.

Figure 4:
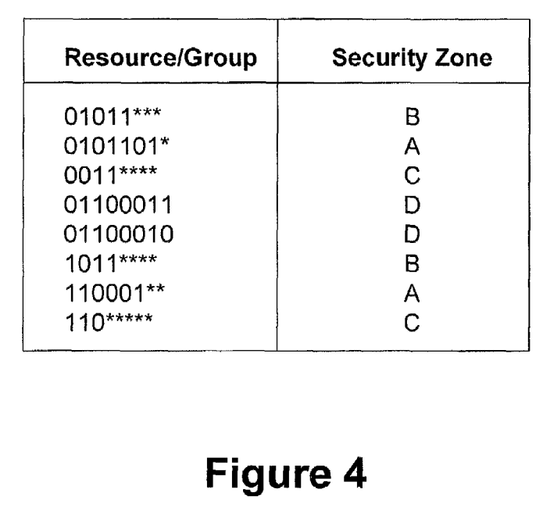
FIG. 4 is a block diagram of an implementation of the network access data structure according to embodiments of the present invention.

In embodiments of the present invention, the data structure 190 may comprise a network resource-to-security zone mapping table 200 that similarly contains the IP address of each resource or group of resources in the TCP/IP network 180, along with the zonename of the security zone to which the resource/group of resources belongs. FIG. 4 depicts such a mapping table 200. As shown in FIG. 4, the mapping table comprises an association between resources and groups of resources in the lefthand column with security zone classifications in the righthand column. In the example of FIG. 4, the resources and groups of resources are specified using their IP address (which for ease of illustration are depicted as 8-bit addresses instead of as 32-bit addresses). In the data structure of FIG. 4, entries in the mapping table specified by their full 8-bit address refer to a specific resource in the network. On the other hand, entries specified by less than 8-bits refer to all the resources which have the specified bits as the beginning portion of their IP address. To show this, the remaining bits are designated as "stars" to indicate that they may be either a zero or a one. As an example, the first entry in the data structure of FIG. 4 is 01011*. This entry refers to each of the eight resources (to the extent the resources are part of the IP network 180) having an IP address beginning with the bits 01011. As shown in FIG. 4**, these eight resources are specified as belonging to security zone B.

As is also shown in FIG. 4, a particular resource may appear to be specified as belonging to more than one security zone. For instance, the second entry in the data structure is 0101101*, which is indicated as belonging to security zone A. Since the first five bits of this entry correspond to the five bits specified in the first entry in the data structure, it may appear that the resources 01011010 and 01011011 belong to both security zones A and B. However, in situations where a resource (or group of resources) appears to be assigned to two or more different security zones, it may be treated as belonging to the security zone specified for the "most specific" entry in the mapping table 200. The "most specific" entry refers to the entry which refers to the smallest number of resources (i.e., the entry in which the most bits of the IP address are not specified using wild card characters). Thus, in the data structure of FIG. 4, the second entry is the most specific entry for the resources 01011010 and 01011011, and hence they are classified as being part of security zone A.

The use of a mapping table such as the mapping table 200 depicted in FIG. 4 may provide for more efficient queries by the TCP/IP kernel 140 than conventional look-up tables or other data structures. In particular, use of a mapping table such as the mapping table 200 depicted in FIG. 4 may allow for specifying the security zone associated with thousands of resources in the IP network with a relatively small number of entries, but still provide complete flexibility as to which security zone a particular resource is assigned. The mapping table 200 may typically be accessed faster than a conventional look-up table which does not group resources, and also typically requires less memory to store.

Referring back to FIG. 3, in operation, when the application 150 transfers data to the TCP/IP kernel 140 for communications over the TCP/IP network 180, the TCP/IP kernel 140 may look at the destination IP address designated for the data that is to be transmitted. The mapping table 200 may then be consulted by the TCP/IP kernel 140 to determine a zone-name of the security zone that is associated with the most specific entry in the table that includes the resource corresponding to the designated destination address for the data. The TCP/IP kernel 140 may then access the data structure 132 in the RACF 130 to determine if the user associated with the application 150 is permitted access to the specified security zone. If access is permitted, the TCP/IP kernel 140 will allow the operation to proceed. If not, the TCP/IP kernel 140 will deny the requested operation. Thus, in this manner the TCP/IP kernel 140 may, in conjunction with the RACF 130, serve to control the access of users of a multi-user system at the source of the potential security breach. Typically, the use of such an access control system would be added as an extra layer of protection, and thus would be used to augment, rather than replace, conventional security safeguards such as firewalls.

Figure 5:
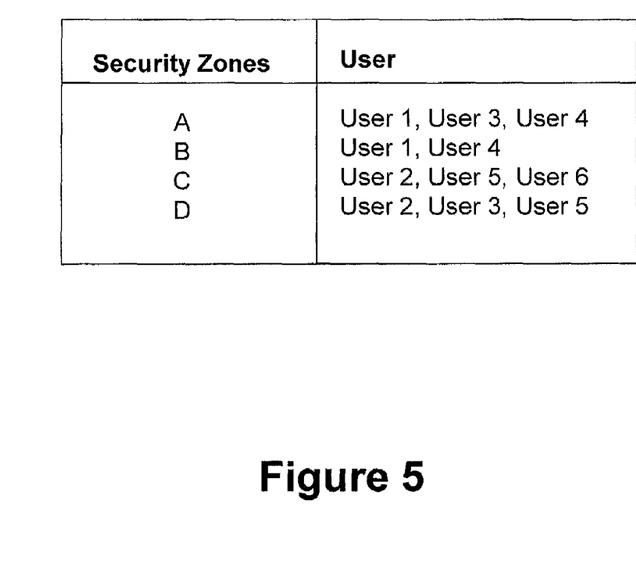
FIG. 5 is a block diagram of an implementation of the security database according to embodiments of the present invention.

FIG. 5 depicts an exemplary embodiment of the data structure 132 that specifies the resources each user of the S/390 may access. As shown in FIG. 5, the data structure may be implemented as a simple look-up table that specifies the users (in the righthand column) that are permitted access to each security zone (which are listed in the lefthand column). It will be appreciated that a wide variety of different data structures may be used to store this information.

Pursuant to particular teachings of the present invention, operations for determining how often resource access checks are performed are also provided. For instance, as is understood by those of skill in the art, IP networks operating under a TCP transport layer protocol build a connection each time a resource communicates with another resource over the IP network. As this connection carries all traffic between the resources until termination of the connection, it may not be necessary to perform a resource access check on every packet that is to be forwarded across the network over the connection. Instead, a resource access check may be performed for an outbound connection during the connect call. Resource access checks may or may not then be performed on packets which are later sent over the network via the connection. As will be understood by those of skill in the art, one situation where it may be desirable to re-perform a resource access check on packets that are being transmitted over a TCP/IP connection is where a user(s) associated with an application changes while the application is still running. If this occurs, it will typically be desirable to re-perform the resource access check even though a new connection has not been established.

Other transport layer protocols, however, such as UDP and RAW, are connectionless protocols. With these protocols, resource access checking may be performed for every outbound packet that is to be transmitted. However, even with these transport layer protocols it will typically not be necessary to perform a resource access check with respect to every packet, as a cache memory often is available with information regarding prior transmissions, and thus the cache may be checked and the resource access check skipped in situations where a packet specifies the same source, destination and user identities as previous packets that were subject to a resource access check.

Typically, embodiments of the present invention only perform resource access checks on packets that originate within the multi-user system that are to be transmitted over the IP network, as packets that are merely being forwarded through the TCP/IP kernel 140 have no associated user. Moreover, the security systems of the present invention may be established so that the IP layer does not require knowledge of the resource access check operations, as such operations may all be carried out at the transport layer.

Operations according to various embodiments of the present invention will now be described further with reference to the flowchart illustrations of FIGS. 6-7. Operations begin with reference to FIG. 6 at block 400 with an application that is running on the multi-user system generating a request to transmit a packet over the IP network. While typically the software application that is running on the multi-user system generates this request, it will be understood that a user is associated with the application, and thus the request may be viewed as having been "originated" by the particular user that is associated with the application. Once this request to transmit a packet is generated, as noted above, it is typically sent to a transport layer process such as TCP, UDP or RAW. In response to the request, a network access data structure may be consulted to determine the security zone associated with the network resource to which the data is to be transmitted (block 402). A user access database or other data structure may then be queried to ascertain whether the user of the multi-user system associated with the application that forwarded the transmission request is allowed access to the security zone associated with the network resource with which it is attempting to communicate (block 404). If the user is allowed access, the operation is allowed and the packet forwarded over the IP network (block 406). If the user is not permitted access, the operation is denied (block 408).

Figure 7:
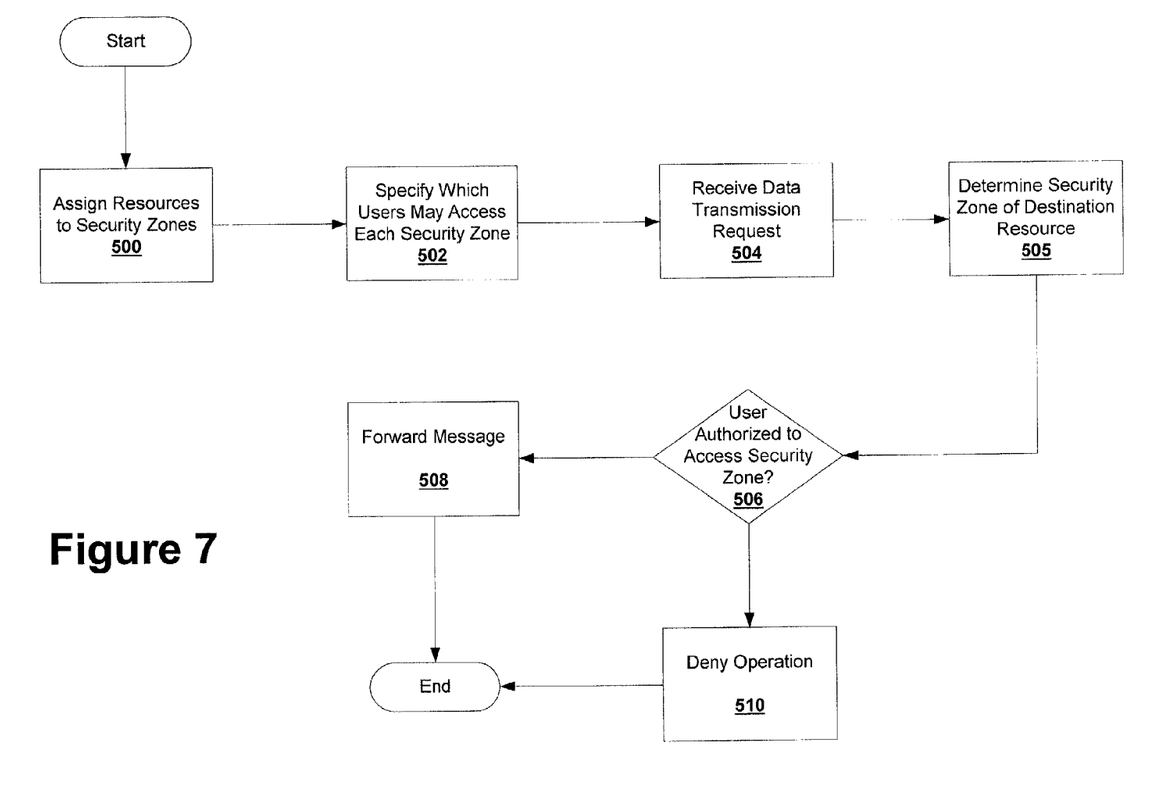
FIG. 7 is a flowchart illustrating operations according to further embodiments the present invention.

FIG. 7 is a flow chart depicting operations according to additional embodiments of the present invention. As shown in FIG. 7, each of a plurality of resources in an IP network may be classified as being associated with one of a plurality of security zones (block 500). As discussed above, the classifications may be done on a resource-to-resource basis or may be done with respect to groups of resources or some combination thereof. Resources in the IP network need not be contiguous to be assigned to the same security zone. The security zone to which one or more of the users of the multi-user system may have access likewise may be specified (block 502). This specification may be performed either before or after the resources in the IP network are classified as being associated with particular security zones. Once the above-mentioned operations have been completed, each time an application or other operation being run by a user of the multi-user system seeks to access or communicate with a resource in the IP network (block 504), a determination may be made as to whether the resource which the user is seeking to access is associated with a security zone to which the user is specified as having access (block 506). If it is, the operation is allowed (block 508). If, on the other hand, it is not, the operation is denied, and the user is not permitted to access or communicate with the resource (block 510). If the resource is not specified as being in any security zone (including the default security zone, if any), the operation is allowed.

It will be appreciated that resources in the IP network may be classified into specific security "levels" or "zones" with respect to each different multi-user system that is part of the IP network. Thus, a particular network resource may, in certain embodiments of the present invention, be part of a first security zone that applies with respect to access requests by users of a first multi-user system, and may be part of a second security zone with respect to access requests by users that are part of a second multi-user system. This may, in certain circumstances, simplify the classification process and limit the number of different security zones which must be specified. However, in other embodiments of the present invention, the IP network resources may be given a global security zone classification which is used with respect to the users of all multi-user systems that are part of the IP network.

As noted above, in certain embodiments of the present invention, a security manager associated with the multi-user system may be used to implement the access control operations of the present invention. One advantage of using such a security manager to implement these operations is that little or no software changes may be required to the security manager. For example, by expanding the database associated with the RACF on an OS/390 system to include information regarding security zones as RACF resources and which users of the multi-user system are permitted access to such resources, the RACF may be used to implement the access control operations of the present invention. Moreover, in many instances, the security manager of the multi-user system may provide information (e.g., a log of access requests that were denied) that may be beneficial from an auditing viewpoint.

Figure 6:
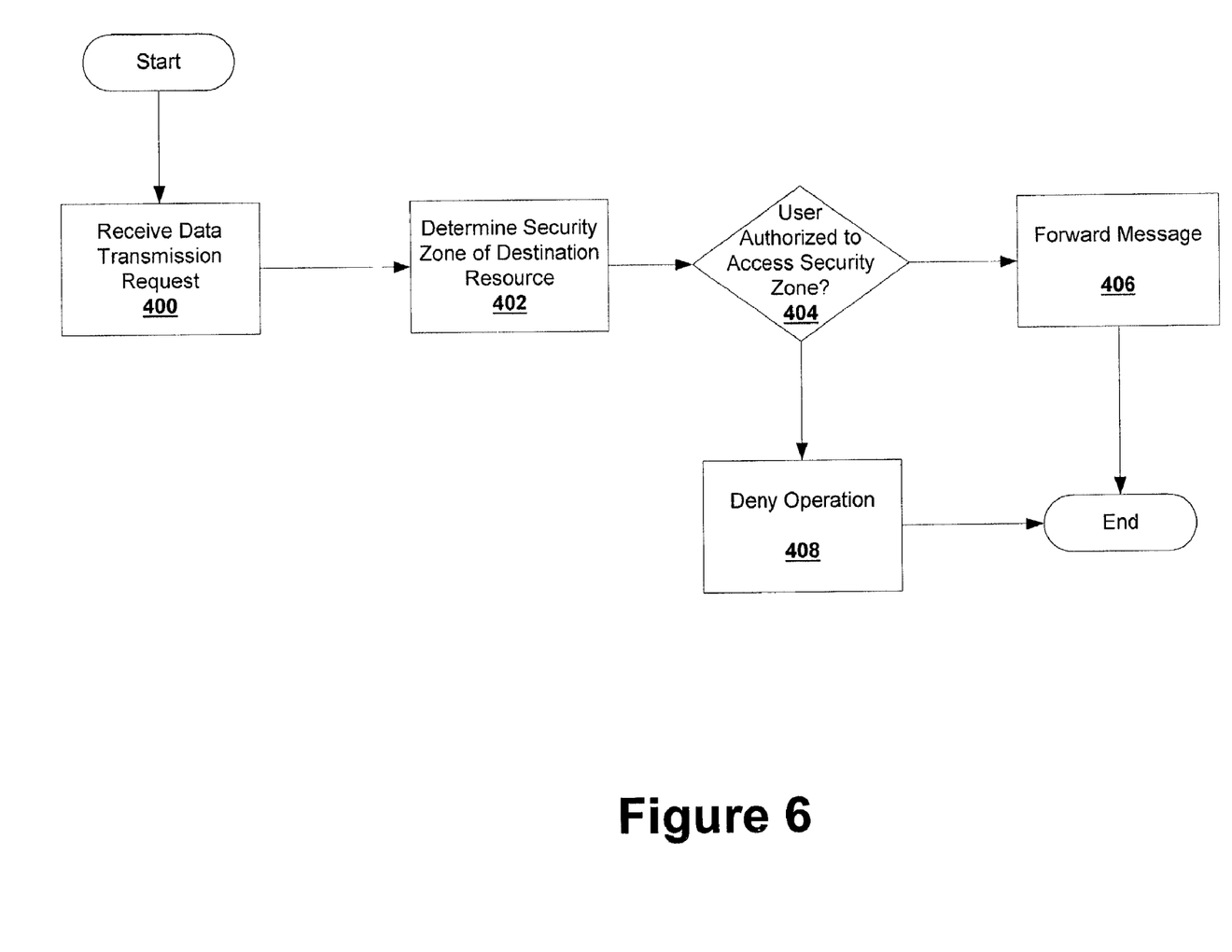
FIG. 6 is a flowchart illustrating operations according to embodiments of the present invention.

The flowcharts and block diagrams of FIGS. 3 and 6-7 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

While the present invention has primarily been described with respect to access control operations that are performed on outbound data packets, it will be appreciated that the operations specified herein may also be modified to allow for access control checks on inbound packets. By way of example (and with reference to FIG. 3), a data packet that is being forwarded over the IP network to an application or process running on the multi-user system may be received by the TCP/IP kernel 140. The TCP/IP kernel 140 may examine the data packet to determine the resource in the IP network that originally forwarded the packet, and may use this information and a mapping table such as mapping table 200 to identify the security zone associated with that resource. The TCP/IP kernel 140 may then access the data structure 132 in the RACF 130 to determine if the user associated with the application running on the multi-user system to which the data packet is being sent is authorized access to the security zone associated with the resource that transmitted the packet. If it is, the data packet is forwarded to the local process or application; if it is not, the data packet is rejected.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for selectively allowing access to a plurality of resources in a network, the method comprising:
    receiving a request originated from a user of a multi-user system to transmit a message via the multi-user system over the network to one of the plurality of resources, wherein each of the plurality of resources has been assigned to one of a plurality of security zones based on a level of security sensitivity of the resource;
    identifying a one of the plurality of security zones that is associated with the one of the plurality of resources;
    determining if the user of the multi-user system is authorized access to the identified one of the plurality of security zones; and
    forwarding the message from the multi-user system over the network only if it is determined that the user is authorized access to the identified one of the plurality of security zones.

2. The method of claim 1, wherein the multi-user system comprises a mainframe computer, and wherein the request is originated on a workstation of the mainframe computer.

3. The method of claim 2, wherein the mainframe computer receives the request originated from the user, identifies the one of the plurality of security zones associated with the one of the plurality of resources, and determines if the user is authorized access to the one of the plurality of resources.

4. The method of claim 3, wherein the step of identifying the one of the plurality of security zone associated with the one plurality of resources comprises accessing a data structure that specifies the security zone associated with each resource in the plurality of resources.

5. The method of claim 4, wherein at least one entry in the data structure specifies the security zone associated with a group of the resources in the plurality of resources, and wherein identifying the one of the plurality of security zones associated with the one of the plurality of resources comprises identifying the security zone associated with the most specific entry in the data structure that includes the resource.

6. The method of claim 1, wherein the identifying and determining steps are performed within the multi-user system.

7. The method of claim 1, wherein the message forwarded over the network includes a first user identification associated with the multi-user system but does not include a second user identification associated with the user of the multi-user system.

8. The method of claim 1, wherein the identifying and determining steps are preformed before any data packets associated with the message are forwarded over the network.

9. The method of claim 1, wherein the network is an internet protocol network.

10. A system for selectively allowing access to a plurality of resources in a network, comprising:
    means for receiving a request originated from a user to a multi-user system to transmit a message via the multi-user system over the network to one of the plurality of resources, wherein each of the plurality of resources has been assigned to one of a plurality of security zones based on a level of security sensitivity of the resource;
    means for identifying a one of the plurality of security zones that is associated with the one of the plurality of resources;
    means for determining if the user of the multi-user system is authorized access to the identified one of the plurality of security zones; and
    means for forwarding the message from the multi-user system over the network only if it is determined that the user is authorized access to the identified one of the plurality of security zones.

11. The system of claim 10, further comprising means for associating a security zone with each of the plurality of resources.

12. The system of claim 11, further comprising means for specifying in advance of receiving the request the security zones to which users of the multi-user system are authorized access.

13. The system of claim 10, wherein the means for identifying the one of the plurality of security zones associated with the one of the plurality of resources comprise means for accessing a data structure that specifies the security zone associated with each resource in the plurality of resources.

14. The system of claim 13, wherein at least one entry in the data structure specifics the security zone associated with a group of the resources in the plurality of resources, and wherein the means for identifying the one of the plurality of security zones associated with the one of the plurality of resources comprises means for identifying the security zone associated with the most specific entry in the data structure that includes the resource.

15. A computer program product for selectively allowing access to a plurality of resources in a network, comprising:
    a computer-readable storage medium having computer-readable program code embodied in said medium, said computer-readable program code comprising:
    computer program product means for receiving a request originated from a user of a multi-user system to transmit a message via the multi-user system over the network to one of the plurality of resources, wherein each of the plurality of resources has been assigned to one of a plurality of security zones based on a level of security sensitivity of the resource;
    computer program product means for identifying a one of the plurality of security zones that is associated with the one of the plurality of resources;
    computer program product means for determining if the user of the multi-user system is authorized access to the identified one of the plurality of security zones; and
    computer program product means for forwarding the message from the multi-user system over the network only if it is determined that the user is authorized access to the identified one of the plurality of security zones.

16. The computer program product of claim 15, further comprising computer program product means for associating a security zone with each of the plurality of resources.

17. The computer program product of claim 16, further comprising computer program product means for specifying in advance of receiving the request the security zones to which users of the multi-user system are authorized access.

18. The computer program product of claim 15, wherein the computer program product means for identifying the one of the plurality of security zones associated with the one of the plurality of resources comprise computer program product means for accessing a data structure that specifies the security zone associated with each resource in the plurality of resources.

19. The computer program product of claim 18, wherein at least one entry in the data structure specifies the security zone associated with a group of the resources in the plurality of resources, and wherein the computer program product means for identifying the one of the plurality of security zones associated with the one of the plurality of resources comprises computer program product means for identifying the security zone associated with the most specific entry in the data structure that includes the resource.

20. A method for selectively allowing a user of a multi-user system access to a plurality of resources in a network, the method comprising:
receiving a message over the network from one of the plurality of resources that is addressed to a process running on the multi-user system that is associated with the user;
identifying, from a plurality of security zones, a security zone associated with the one of the plurality of resources;
determining if the user is authorized access to the identified security zone; and
forwarding the message to the process only if it is determined that the user is authorized access to the identified security zone.

21. The method of claim 20, wherein the multi-user system identifies the security zone associated with the one of the plurality of resources and determines if the user is authorized access to the identified security zone.

22. A data processing system for selectively allowing access to a plurality of resources in a network, comprising:
a data processing device, the data processing device connected to a first network that includes a plurality of networked resources;
a plurality of workstations that are configured to execute applications on the data processing device;
a first data structure that specifies at least one security zone from a plurality of security zones that is associated with each of the plurality of networked resources, wherein each of the plurality of security zones represents a distinct level of security sensitivity; and
a second data structure that specifies the respective security zones to which a plurality users of the data processing device may have access.

23. The data processing system of claim 22, wherein the first data structure comprises a mapping table that identifies the respective one of the plurality of security zones associated with each of the plurality of networked resources, wherein at least some of the entries in the mapping table are associated with multiple of the plurality of networked resources.

24. The data processing system of claim 23, wherein entries in the mapping table include wildcard characters to specify multiple of the plurality of networked resources with a single entry in the mapping table.

* * * * *